US006453921B1

(12) United States Patent
Rost

(10) Patent No.: US 6,453,921 B1

(45) Date of Patent: Sep. 24, 2002

(54) STAIR WALKER

(75) Inventor: Brian Mitchell Rost, Tacoma, WA (US)

(73) Assignee: Brian M. Rost, La Grande, OR (US)

(*) Notice: Subject to any disclaimer, the term of this patent is extended or adjusted under 35 U.S.C. 154(b) by 15 days.

(21) Appl. No.: 09/713,060

(22) Filed: Nov. 16, 2000

(51) Int. Cl.[7] .......................... A61H 3/00; F16M 13/08

(52) U.S. Cl. .............................. 135/67; 297/5; 135/75; 482/68

(58) Field of Search ......................... 135/67, 75; 297/5; 482/68; 280/87.05

(56) References Cited

U.S. PATENT DOCUMENTS

| | | | | | |
|---|---|---|---|---|---|
| 2,708,473 | A | * | 5/1955 | Gable et al. | 135/67 |
| 3,176,700 | A | * | 4/1965 | Drury | 135/67 |
| 3,387,618 | A | * | 6/1968 | Swann | 135/67 |
| 3,421,529 | A | * | 1/1969 | Vestal | 135/67 |
| 3,455,313 | A | * | 7/1969 | King | 135/67 |
| 3,800,815 | A | * | 4/1974 | Birk | 135/67 |
| 4,094,331 | A | * | 6/1978 | Rozsa | 135/67 |
| 4,411,283 | A | * | 10/1983 | Lucarelli | 135/67 |
| 4,777,973 | A | * | 10/1988 | Nakajima | 135/67 |
| 4,995,412 | A | * | 2/1991 | Hirn | 135/67 |
| 5,263,506 | A | * | 11/1993 | Narramore | 135/67 |
| 5,349,977 | A | * | 9/1994 | Wood | 135/67 |
| 5,499,645 | A | * | 3/1996 | Baliga | 135/67 |
| 5,603,517 | A | * | 2/1997 | Lorman | 135/67 |
| 5,636,651 | A | * | 6/1997 | Einbinder | 135/67 |
| 5,649,558 | A | * | 7/1997 | Richard | 135/67 |
| 5,740,825 | A | * | 4/1998 | Brunengo | 135/67 |
| 5,787,913 | A | * | 8/1998 | Li | 135/67 |
| 6,145,524 | A | * | 11/2000 | Li | 135/67 |

* cited by examiner

*Primary Examiner*—Beth A. Stephan

(57) ABSTRACT

A stair walker device for aiding ambulatory persons in ascending ad descending stairs, ramps and other uneven walkable surfaces. A pair of hand-controlled levers used separately or together to adjust the front legs, by controlling the extension or retraction of a pair of front leg portions. The rear legs are adjusted for the user's height once only by suitable adjustable fastening. The sides of the stair walker frame can be readily folded for storage or for carrying.

3 Claims, 5 Drawing Sheets

STAIR WALKER

BACKGROUND OF THE INVENTION

1. Field of the Invention

The present invention relates to a collapsible, four-legged walker aid apparatus for those persons requiring walkers to travel on either level or inclined ground, and to negotiate stairs. The stair walker has four extendable and retractable vertical legs, with each of the front two legs being made up of three concentric tubes controllable by individual hand control levers and cables, to extend or retract the front pair of legs simultaneously.

2. Description of Related Art

References

| | | | |
|---|---|---|---|
| 5,649,558 | 07/97 | Richard | 135/97 |
| 4,411,283 | 10/83 | Lucarelli | 135/97 |
| 3,176,700 | 04/65 | Drury | |
| 5,636,651 | 07/97 | Einbinder | 135/97 |
| 2,708,473 | 05/55 | Gable, et al. | |
| 3,387,618 | 06/68 | Swann | |
| 3,421,529 | 01/69 | Vestals | |
| 4,094,331 | 06/78 | Rozsa | |
| 5,740,825 | 04/98 | Brunengo | 135/67 |
| 5,349,977 | 09/94 | Wood | 135/67 |
| 5,603,517 | 02/97 | Lorman | |
| 4,995,412 | 02/91 | Hirn et al. | 135/67 |

The related art of interest shows various stair walkers and mechanisms for extending and retracting walker appendages. The related art will be discussed in the order of perceived relevance to the present invention.

U.S. Pat. No. 5,649,558 issued on Jul. 22, 1997, to Reginald L. Richards describes an accommodation walker having four legs with shortening of the front pair of legs occurring by separate hand controls to manipulate an externally exposed rack and gear control through exposed cables. The front legs are lengthened only by gravity when the racks and gears are disengaged. A reversible motor may be substituted for the rack and gears mechanism. The rear legs may be shortened by spring loaded push buttons (not shown) that cooperate with extension holes. The walker is distinguishable by its reliance on separate hand controls for the front pair of extendable legs for shortening by the non-equivalent exposed cables, rack and gear controls and motor, i.e., both handles are necessary. The front legs are lengthened manually with the aid of gravity. The present invention hides the cables and spring mechanism by the use of three tubes. Additionally, there is no suggestion for folding the walker in the manner taught in the present invention.

U.S. Pat. No. 3,455,313 issued on Jul. 15, 1969, to Harold L. King describes a four-legged walker with two arcuate cross braces. Each leg has an overlapping apertured leg extension mechanism that is extendable by a spring which is released by a right and left hand grip housing two pins traveling in slots in either the pipe or the handgrip. A cable from the hand-grip retracts a semicircular spring connected pin from a hole in the overlapping leg extension. A second coil spring effects the extension of a leg until the pin enters another hole to lock the leg extension. The separate handgrip mechanisms and the pin locking mechanism are totally different from the single hand possible locking mechanism of the present invention. Additionally, the walker has external legs as opposed to the internal legs of the present invention and is not foldable.

U.S. Pat. No. 3,176,700 issued on Apr. 6, 1966, to John H. Drury, Jr. describes a walking aid device consisting of a tubular frame with four legs, and upper arcuate front bar, a U-shaped support bar, and hand grips on the sides of the upper arcuate front bars. The two legs regarded as rear legs have contractible leg portions which telescope into the fixed legs by depressing locking buttons located at the mid-sections of the rear legs and contracting coiled springs. Each adjustable leg is locked in a shortened state by the button accessing another hole in the upper leg. The locking button is motivated by another U-shaped spring. A bolt in an upper leg travels in a slot of the contracting leg to maintain a non-twisting condition. The process of ascending and descending stairs requires the user to rotate the walker 180 degrees. The walker is distinguishable by having only two adjustable legs, a non-folding walker and the requirement for laboriously reaching down for the release button on each leg.

U.S. Pat. No. 4,411,283 issued on Oct. 25, 1983, to Frank J. Lacarelli describes an invalid walker formed from tubular aluminum having a telescoping front leg assembly which slides through a pair of guide tubes and is integrated with a cross bar adjustment member. The rear pair of legs have hand grips on an upper medial and integral front support and an additional lower support frame, wherein both supports are clamped to the front guide tubes. The front legs are adjustable in a height range of 2 feet by utilizing a manually movable locking assembly with a clip on each leg which slides into one of 24 slots in the inner surface of the front legs. The lock must be removed first before the clip can be moved along the telescoping leg. A click and drag pin is also located on an inner surface of the guide tube to indicate the movement of the telescoping legs. The rear legs have adjustable foot portions with indexing buttons and elongated feet directed inward. The walker is distinguished by individual locking of only two front legs clips which must be manipulated by hand in a two-step process. Also, the front legs lack springs to motivate either the extension or retraction of the legs.

U.S. Pat. No. 5,636,651 issued on Jun. 10, 1997, to Eli Einbinder describes an adjustably controllable walker with two U-shaped tubes with a cross bar and four legs with wheels which can be controlled by an actuator means such as a button, pressure sensor or lever. The actuator may control a stabilizer brake mechanism to engage or release a brake. Lifting the walker can release the brake. A strain gauge or lifters may be provided to respond to the lifting force. The walker is distinguishable by its reliance on wheels and brake mechanisms.

U.S. Pat. No. 2,708,473 issued on May 17, 1955, to Harry L. Gable et al. describes a walker with six legs and feet, wherein the middle legs are positioned by set screws acting through collars on upper side bracing members. Anther set of collars on lower side bracing members stabilize the middle pair of extendable legs. The walker is deemed distinguishable by its requirement for six legs and manual adjustment of each middle leg in negotiating a flight of steps.

U.S. Pat. No. 3,387,618 issued on Jun. 11, 1968, to David T. Swann describes a walker in the form of a cane or a crutch on a vertical shaft welded to a horizontal yoke member with a pair of pivotal and vertical short legs extendable from a braced upper sleeve portion. The vertical shaft has a pivotal horizontal upper leg with a cross arm which is extendable from a sleeve section. The configuration of the walker thus accommodates three steps. The walker is distinguishable by its three-step stair conforming structure.

U.S. Pat. No. 3,421,529 issued on Jan. 14, 1969, to Richard A Vestal describes another three-step stairway walker having a main frame formed from an upper horizontal U-shaped member secured at its middle front portion, and two rectangular and vertical side subframes. Each vertical side subframe has a set of L-shaped leg portions with shorter rear leg portions. The outwardly extending feet are attached vertically to the main frame by a plurality of sleeves with the uppermost sleeve having thumb screws for securing the legs by the user. The front and rear sets of feet are adjusted to conform to the steps. The walker is distinguishable by its three-step structure.

U.S. Pat. No. 4,094,331 issued on Jun. 13, 1978, to Peter Rozsa describes a walker for negotiating stairs by ascending in one position and descending by reversing the position of the walker, and walking on a level surface by inverting the walker. The walker consists of two side frames substantially in the form of a rectangle with an indented top portion having a centered rubber or plastic sleeve. A necked and coupled center portion has a leg extending on each side (front or rear) and a pair of handles extending from a region above the necked portion and directly above the extended legs. The extendable legs are apertured sleeves locked by a spring loaded pin. The walker is distinguishable by its reliance on extending only two legs manually instead of automatically.

U.S. Pat. No. 5,740,825 issued on Apr. 21, 1998, to P. J. Brunengo describes an articulated walker having a first and second side section, each having a front and rear leg, an upper cross section, and a lower cross section. The side sections are coupled by an upper horizontal cross bar and a lower horizontal cross bar. The walker adjusts for stair height by a pivotal relationship between the upper and lower cross ties and the front and rear legs. Adjustment of the legs is achieved by pulling on handles that release a pin-locked cam mechanism located on the lower cross tie of each side section. The walker is distinguishable by not having individual legs that are adjustable and not maintaining a level upper cross tie for gripping when ascending or descending stairs.

U.S. Pat. No. 5,349,977 issued on Sep. 27, 1994, to Maurice Wood describes a kit including four supplemental legs, two actuating bars, and the mechanical means to attach the apparatus to an existing walker for the accommodation of stairs or inclines. The user is able to adjust the front and back legs of one side of the walker by pulling the actuating lever and letting gravity adjust the legs to a desired height. This allows the user to navigate stairs by leaving the walker pointed straight ahead and engaging both actuator bars, or turning the walker sideways and engaging only one actuator bar. This inventions is distinguishable in that it is an attachment to an existing walker and therefore has external components, and also by the ability to control both legs on one side with the one actuator bar but not both front legs with one lever.

U.S. Pat. No. 5,603,517 issued on Feb. 18, 1997, to Shmil Lorman describes a rollable and foldable walker frame having a seat, four wheels, and four handles. The wheels can be locked automatically by braking devices. The walker frame comprises a first frame element consisting of two parallel curvilinear tubes with extendable curved handles at the upper ends, and non-extendable wheeled legs at the opposite ends which are connected by a cross bar. A second frame element which is U-shaped in front and with L-shaped sides comprises a foldable seat with non-extendable rear wheeled legs. A third frame element with two parallel inverted L-shaped tubular portions has a second set of height adjustable handles at its upper ends, and its opposite ends are connected to the pair of first frame elements. Two pairs of braking devices are connected to the rear and front legs, each of the braking devices slidably supports one of the wheel mounts over a wheel such that the application on the frame of a downward force urges the braking of the wheels. The walker is distinguishable by its unique braking devices and four wheels.

U.S. Pat. No. 4,995,412 issued on Feb. 26, 1991, to Doris Hirn et al, describes a walker with two side sections connected in the front by two horizontal cross bars. The device is able to be transformed into a cane and is also adjustable for people of varying height and width. The walker is distinguishable by needing manual adjustment for ascending or descending stairs.

None of the above inventions and patents, taken either singly or in combination, is seen to describe the instant invention as claimed.

SUMMARY OF THE INVENTION

The present invention relates to a foldable four-legged walker aid apparatus for those persons requiring walkers to travel on either level ground or inclined ground, and to negotiate both the ascent and descent of stairs. The stair walker has four extendable an retractable vertical legs, with the front two legs each being made up of three concentric tubes controllable by individual hand control levers and cables, to extend or retract the front pair of legs simultaneously. Each control lever controls both front legs, affording the advantage that a user with impaired use of one upper extremity may use just one hand to control both front legs.

Accordingly, it is a principal object of the invention to provide a four-legged walker aid apparatus with a pair of adjustable front legs and a pair of adjustable rear legs.

It is another object of the invention to provide a four-legged walker aid apparatus for traveling on either level ground, inclined ground, or in negotiating stairs.

It is a further objective of the invention to provide a four-legged walker aid apparatus wherein the pair of front legs can be automatically extended and retracted by hand control, and the height of the pair of rear legs can be adjusted manually.

Still another object of the invention is to provide a four-legged walker aid apparatus which is foldable for storage or for transporting the device, such as in a car or on escalator stairs.

Yet a further object of the invention is to provide a four-legged walker aid apparatus with one size which can accommodate persons of any height by adjustment of the P-shaped rear frame elements within the bracket holding each of the P-shaped rear frame elements to the front leg frame element.

It is an object of the invention to provide improved elements and arrangements thereof in an apparatus for the purpose described which is inexpensive, dependable, and fully effective in accomplishing its intended purposes.

These and other objects of the present invention will become readily apparent upon further review of the following specifications and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a four-legged walker aid apparatus for those persons requiring walkers to travel on level ground, inclined surfaces, and to negotiate stairs. The stair walker has two extendable and retractable front legs made up of three concentric tubes, each being controlled by either one of a pair of levered hand controls, and two manually height-adjustable rear legs. A pair of side brackets enable further height adjustment between the front legs and the rear legs. The walker aid is designed for accommodating a user of any height.

Figure 1:
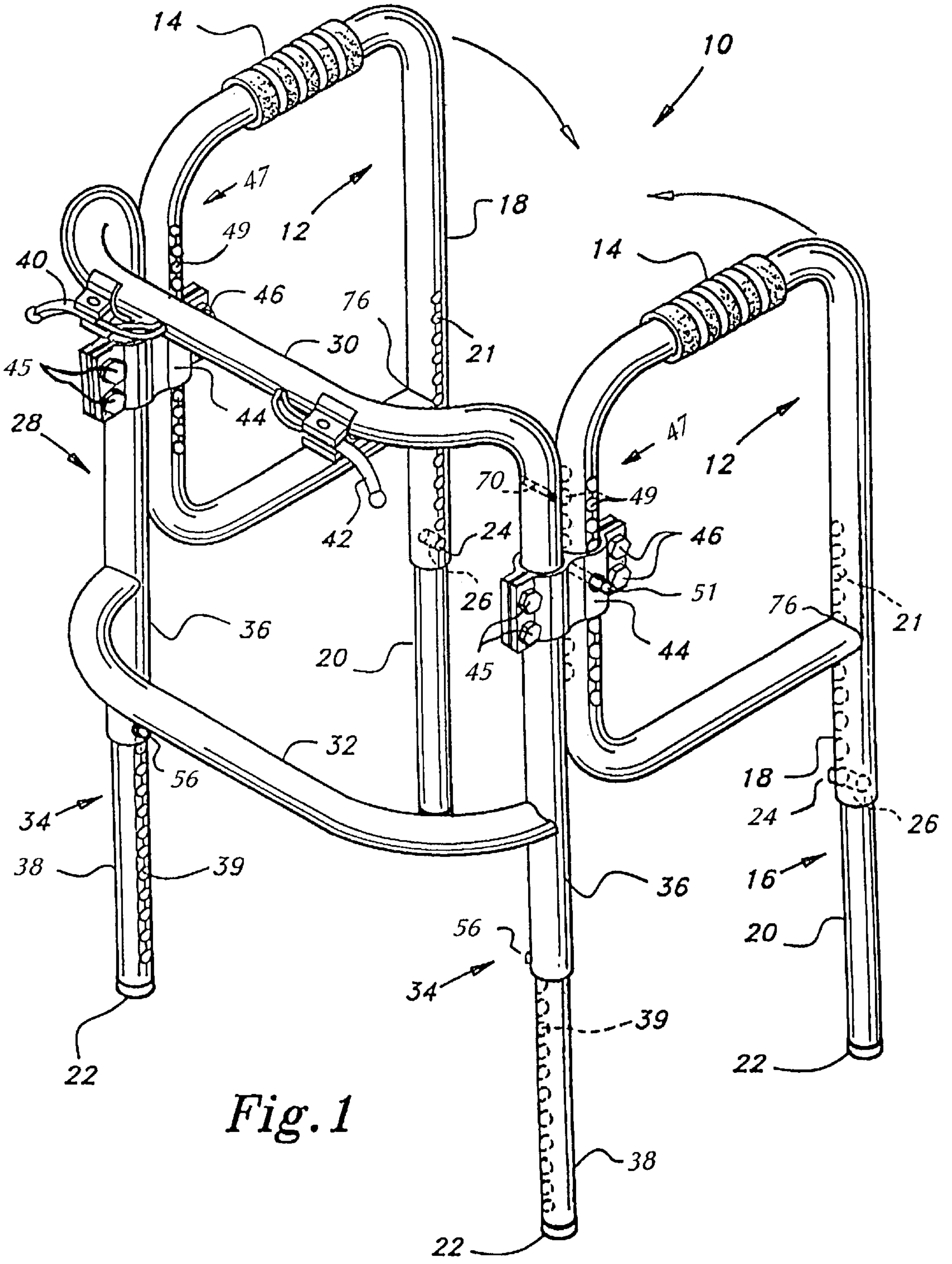
FIG. 1 is a perspective view of a folding stair walker apparatus according to the present invention.

Referring in general to FIG. 1, the stair walker is a self-standing apparatus with a pair of P-shaped rear frame elements 12 and a U-shaped front element 28 with an upper curvilinear crossbar 30 and a lower curvilinear crossbar 32 to add stability. Both the P-shaped rear frame elements 12 and the U-shaped front element 28 house adjustable front 38 and rear 20 leg portions with plastic rubber caps 22 to prevent slipping of the device. The P-shaped rear frame elements 12, the U-shaped front frame element 28 with upper curvilinear crossbar 30 and lower curvilinear crossbar 32, and the front 38 and rear 20 leg portions are all made of a light weight metal, such as aluminum, or a fiberglass material.

The pair of P-shaped rear frame elements 12 are created by either bending the material to form a P-shape and making a weld or adhesion at the junction 76, or welding or adhering each corner individually. Resilient hand grips 14 are centered on a top portion of the rear frame elements 12. Each rear leg sleeve portion 18 contains a series of apertures 21 (in shadow) drilled into one side of the tube to accept a spring-loaded button 24 contained inside the top of each rear leg portion 20. The apertures 21 are illustrated in FIG. 1 as being on the inside or medial surface of each rear leg sleeve portion 18 but may also be positioned on the posterior or lateral surface of each rear leg sleeve portion 18. Each rear sleeve leg portion 18 accepts the rear legs 16 in a sliding, telescoping manner. Adjustment of the rear legs 16 is accomplished by pushing in the spring-loaded button 24 and traversing the apertures 21 located on the rear leg sleeve portion 18. This adjustment is usually made once by the user to match their height requirements and is not changed thereafter by that user.

The U-shaped front element 28 with the upper curvilinear crossbar 30 is also made by either bending or welding the individual corners. The lower curvilinear crossbar 32 is either bent or welded at the corners and then attached to the U-shaped front frame element 28 at the front leg sleeve portions 36 by weld or adhesive. The front leg portions 36 of the U-shaped front frame element each contain an inner tube 62 (depicted in FIGS. 5–7) and accept the front legs or middle tubes 38 in a sliding and telescoping manner. The front leg portions 38 contain a series of apertures 39 drilled into the material on only one side that accept a spring loaded button 56 built into the inner tube portion 62 which will be explained fully in the discussion of FIGS. 5–7. The apertures 39 and spring-loaded button are illustrated in FIG. 1 as being on the inside or medial surface of the front leg portion 34 but may also be located on the posterior surface of the front leg portion 34. The front legs 34 are adjusted using either of the pair of bicycle type control levers 40 and 42 that are positioned on the surface of the upper curvilinear crossbar 30. The levers 40 and 42 are illustrated in FIGS. 1–4 as being on the front surface of the upper curvilinear crossbar 30 but may be positioned on any surface of the upper curvinlinear crossbar 30. The levers 40 and 42 are attached to the upper curvilinear crossbar 30 by weld, a bolted bracket, or any other form of adhesion. The levers 40 and 42 together or independently control the extension and retraction of the front legs 34 only, as will be fully explained in the discussion of FIGS. 5–7.

Figure 3:
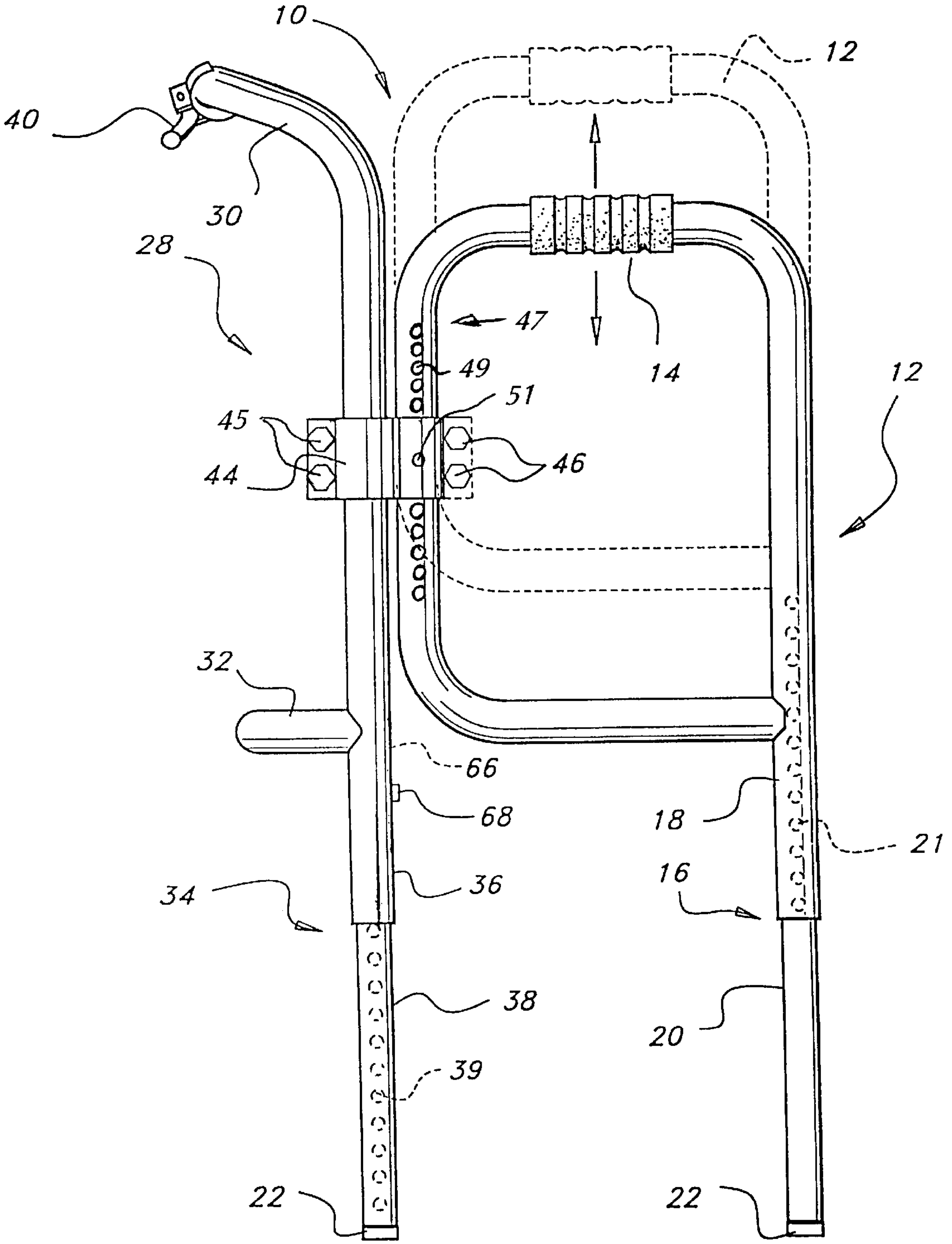
FIG. 3 is an enlarged scale, left side view of the walker demonstrating height adjustment of the walker by utilizing the brackets which hold the P-shaped rear frame elements to the front frame element.

Brackets 44 with front fasteners 45 and rear fasteners 46 are utilized to connect the P-shaped rear frame elements 12 with the U-shaped front frame element 28. The brackets 44 can be loosened or tightened, allowing adjustment of the P-shaped rear frame elements 12 on the U-shaped front frame element 28, by adjusting the front and rear fasteners 45 and 46. This allows for an inward folding of the P-shaped rear frame elements 12, as shown by the arrows, for storage or transport, and also allows the user to adjust the height of the P-shaped rear frame elements 12 without making adjustments to the U-shaped front frame element 28 as shown in FIG. 3. To increase stability, the brackets 44 may be held in place on the front leg portion 36 by weld or other form of adhesive, allowing only the posterior half of the bracket 44 to be loosened for adjustment using the rear fasteners 46. The height of the P-shaped rear frame elements 12 are more accurately adjusted by drilling apertures 49 through the front bar portion 47 of the P-shaped rear frame element 12 that accept a metal cotter pin 51 that is run through the posterior portion of the bracket 44. The brackets 44 can be fabricated out of a hard metal such as steel or a hard plastic and have a rubber lining on the inside to prevent slipping of the front frame element 28 and rear frame element 12 inside of the brackets 44.

Figure 2:
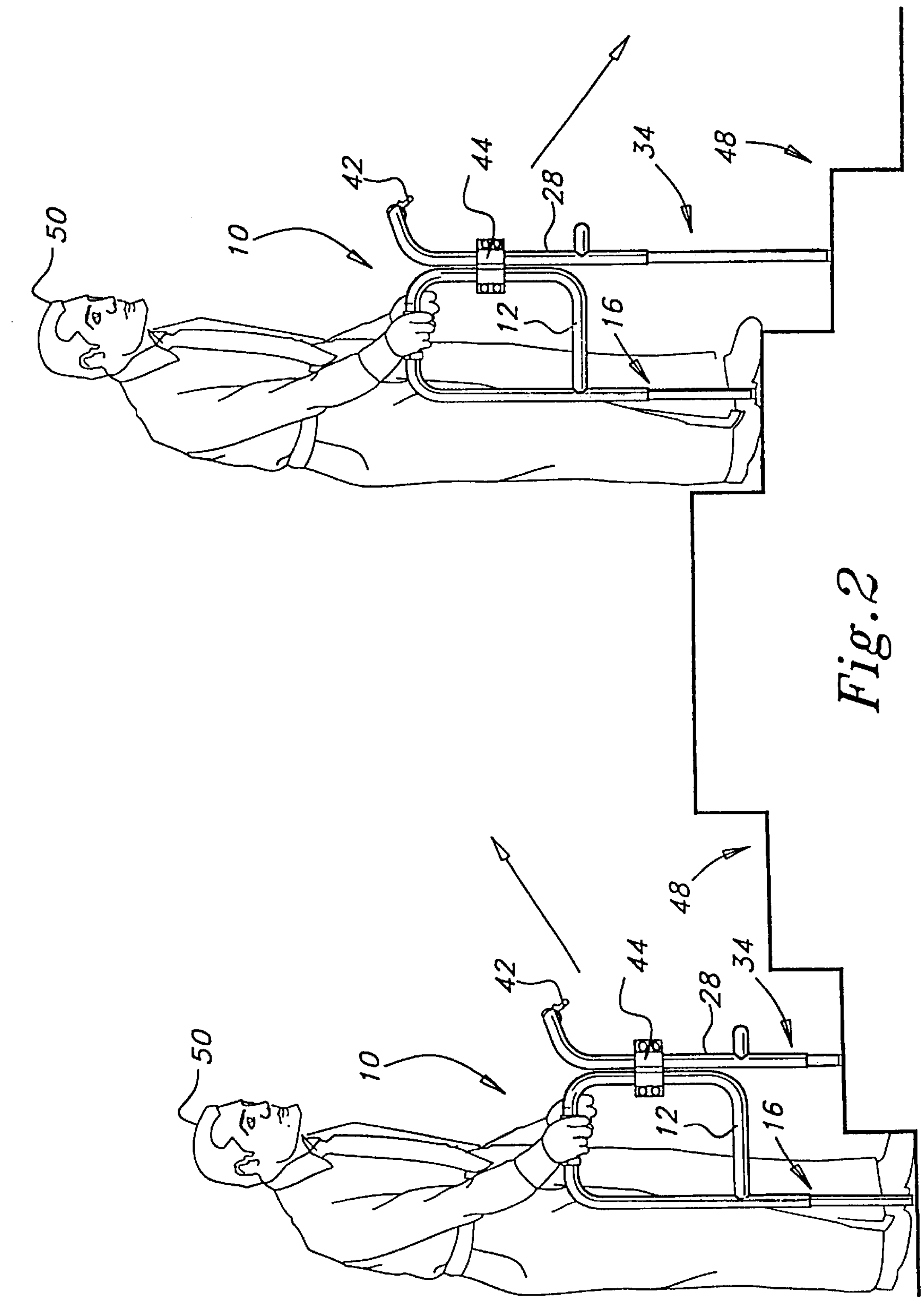
FIG. 2 is a schematic side view of a user traversing a flight of stairs in an ascending position and a descending position with the aid of the walker.

FIG. 2 illustrates the convenience of using the walker aid apparatus to negotiate the ascent and descent of stairs 48 by a user 50. It is important to note that the walker aid 10 need not be reversed for its use in ascending and descending stairs 48. More importantly, the set of front legs 34 are controlled by the hand levers 40 or 42 in adjusting to a suitable extension or retraction. Moreover, the two front legs 34 are controlled simultaneously by either of the hand control levers 40 (not shown) and 42. This feature is particularly advantageous for the individual who may have lost the ability to use one upper extremity or hand, either permanently or temporarily. The user 50 can soon judge by experience the preferred extension or retraction of the front set of legs for a given stairway.

FIG. 3. shows the adjustment possible for increasing the height of the P-shaped rear frame element 12 (in shadow) or to decrease the height of the P-shaped rear frame element 12 (not shown) to accommodate a user of greater or lesser height, respectively, by means of the bracket 44 and fasteners 45 and 46. The height of the P-shaped rear frame element is accurately controlled by lining up the apertures 49 on the front bar portion 47 of the rear frame element 12 with the bracket 44 so that a cotter pin 51 can be inserted through the posterior half of the bracket 44 and the apertures 49, locking the rear frame element 12 at a set height. The rear leg portion 20 can then be adjusted by lining up the correct apertures 21 on the rear sleeve portion 18, with the spring loaded button 24 housed in the rear leg portion 20, in a sliding, telescoping manner, so that walker aid apparatus 10 sits level. This adjustable height feature of the rear frame element 12, utilizing the bracket 44, enables a wide range in height of the device to accommodate each user regardless of their height.

Figure 4:
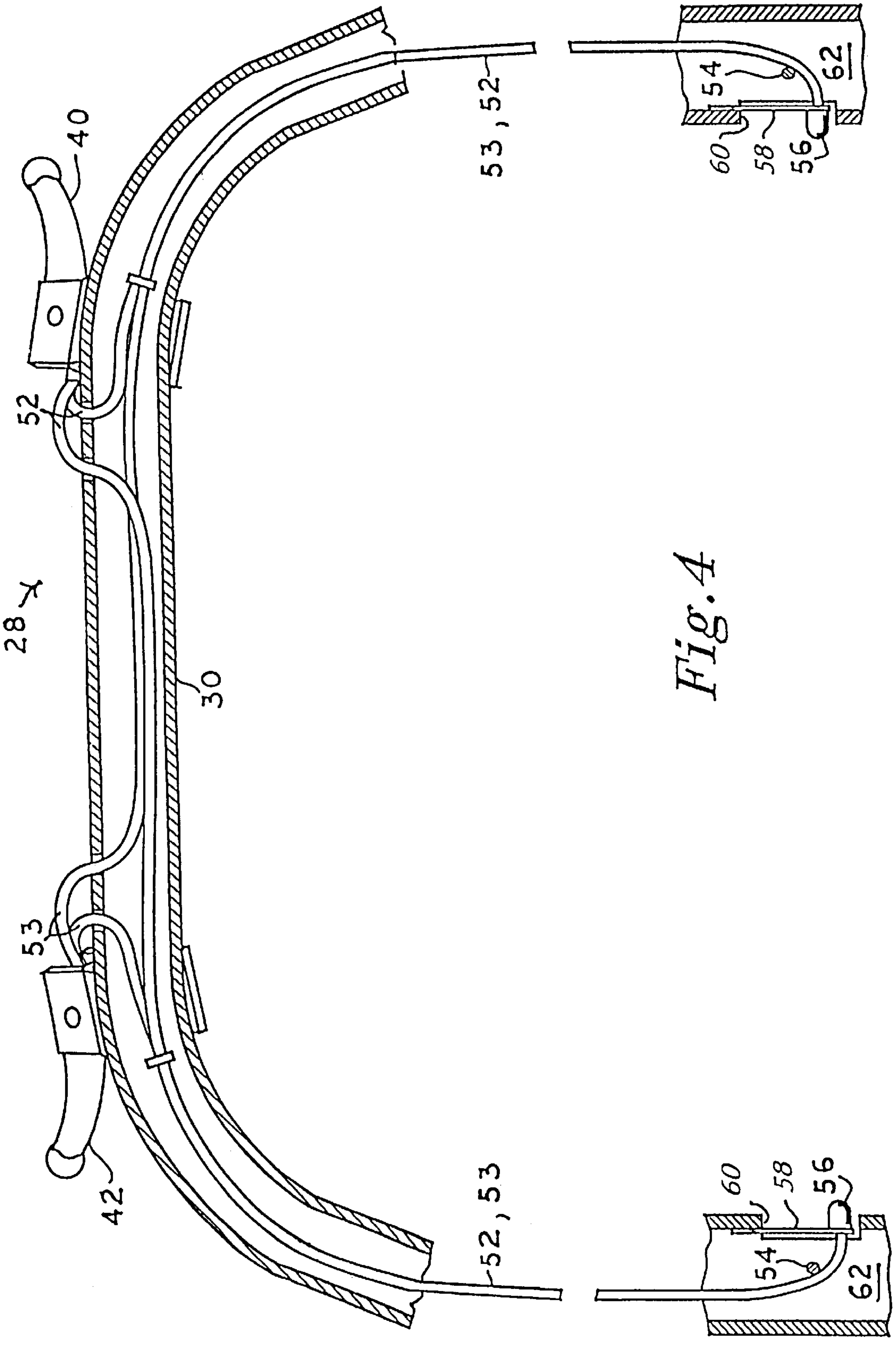
FIG. 4 is an elevational, partially sectional and fragmentary front view of the handle controls and the front legs for operating the extension and retraction of the adjustable legs.

FIG. 4. illustrates the part of the front frame element 28 with either the right hand control lever 40 or the left hand control lever 42 controlling the two front legs 34 (FIGS. 1–3, 5–7) simultaneously. This feature allows one-hand controlled height adjustment of the front legs by the user who may have limited or no use of one upper extremity or hand. This unique control of the adjustment of the front pair of legs 34 is obtained by having a total of four cables, two cables 52 from the right hand control lever 40, and two cables 53 from the left hand control lever 42, which cross such that one cable from each lever 40 and 42 traverse down each front leg and ending at the spring-loaded steel button 56 contained in the bottom of the inner tube 62, which is housed inside of the front leg portions 36 (shown in FIGS. 1–3, 5–7). Each of the four cables 52 and 53 are inserted into the U-shaped front frame element 28 by drilling holes in the upper curvilinear crossbar 30. Anyone skilled in the art of such mechanisms will understand that when either hand control lever 40 or 42 is pulled back towards the upper curvilinear crossbar 30, the cables 52 and 53 will be pulled in a manner that will pull back on the spring-loaded steel button 56 in each leg.

The spring-loaded steel button 56 contained in the base of each inner tube 62 is attached to a flat strip of resilient metal 58, known to those skilled in the art as "spring" metal, that is adhered to the inside of the base of the inner tube 62 at a spot indicated by reference character 60 with any number of strong adhesives, weld, or metal insert. One side of the lower portion of the inner tube 62 must be cut away to allow the spring-loaded button 56 to traverse the apertures 39 located in the middle tubes 38 and the single aperture 74 (FIG. 7) located in each outer tube 36 of the front legs, explained fully in the discussion of FIGS. 5–7. Metal cross pins or screws 54 must be inserted through the base of each inner tube 62 so that the cables 52 and 53 can be passed over the metal cross pins 54 before being connecting to the spring-loaded buttons 56 by weld, screw, or wire fastener. Someone skilled in the art will understand that the metal pin or screw 54 allows a more advantageous direction of pull by the cables 52 and 53 on each spring-loaded button 56. After inserting the metal pins or screws 54, the outer surface of the base of the inner tube 62 must be filed smooth of any projections to allow for a smooth sliding, telescoping action of the middle tube or front leg 38 (FIGS. 1–3, 5–7) over the base of the inner tube 62. The construction of the spring-loaded button mechanism 56, 58, 60, and 54 must be completed prior to the insertion of the inner tube 62 into the front leg sleeve 36 (FIGS. 1–3, 5–7) of the U-shaped front frame element 28, which is described in the discussion of FIGS. 5–7. The attachment of the cables 52 and 53 to the spring-loaded button 56 must occur after the inner tube 62 is inserted into the front leg sleeve 36 (FIGS. 1–3, 5–7) of the U-shaped front frame element 28.

Figure 5:
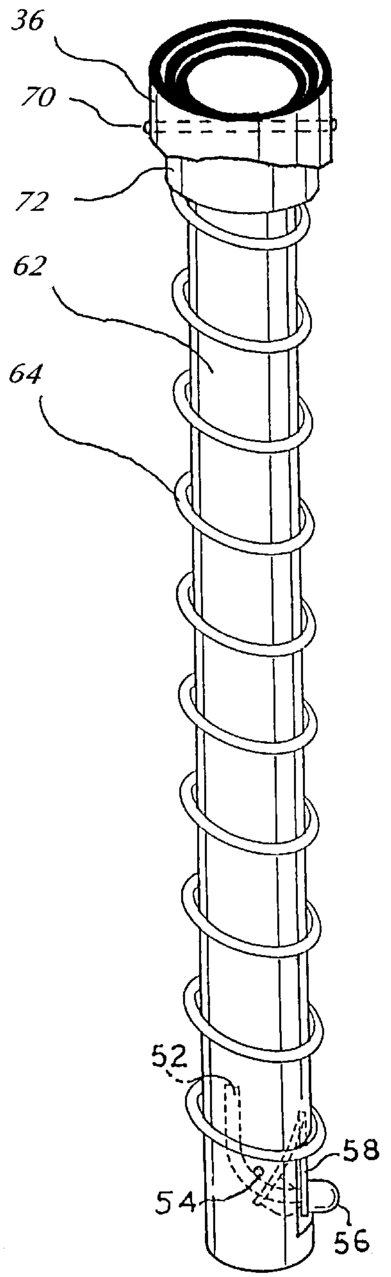
FIG. 5 is an elevated side view of an adjustable front leg showing the relaxed spring with the inner leg tube having the spring loaded button, omitting the middle tube, and the outer tube being partially broken away.
Figure 6:
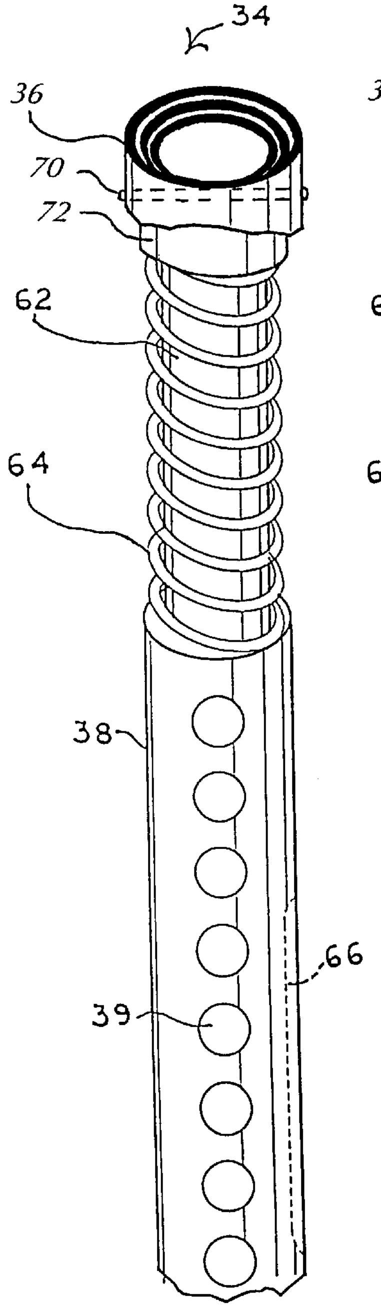
FIG. 6 is an elevated side view of an adjustable front leg showing the contracted spring with the middle tube having a slot for the alignment bolt, and the middle and outer tubes partially broken away.
Figure 7:
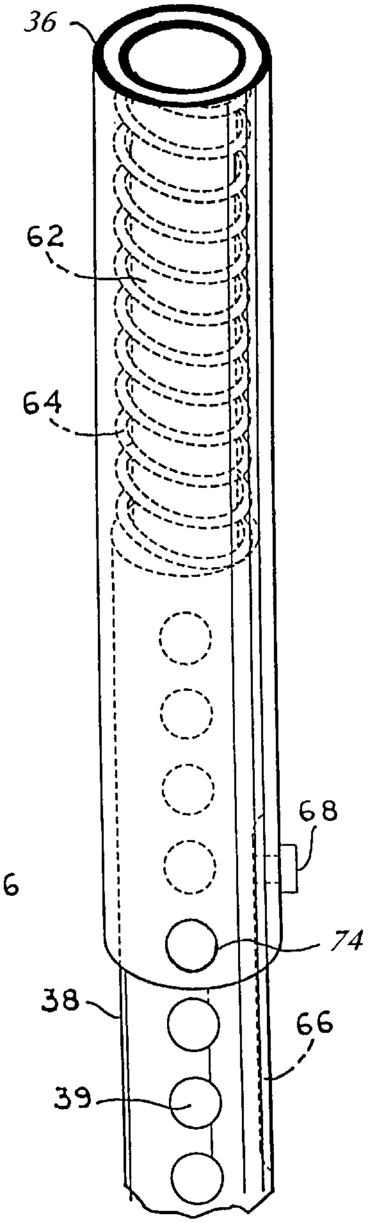
FIG. 7 is an elevated view of an adjustable front leg showing the inner tube and the contracted spring in shadow, the middle tube partially, and the outer tube with the alignment bolt within the slot of the middle tube.

FIGS. 5, 6, and 7 illustrate the unique three-tube structure of the adjustable front legs 34. The three tubes include; the inner tube 62 which contains the spring-loaded mechanism for controlling the height of the front leg via the middle tube 38, the middle tube 38 which has the apertures 39 drilled into one side for the acceptance of the spring loaded button 56, and the outer tube or front frame sleeve portion 36 which houses the inner tube 62 and middle tube 38. A coil spring 64 sits between the inner tube 62 and the outer tube 36, and rests on top of the middle tube 38 to assist gravity when extending the middle tubes 38 when descending stairs. When assembling this three tube structure, first the inner tube 62 is inserted and connected to the outer tube 36 as described in the following paragraph, next the spring 64 is inserted between the inner tube 62 and the outer tube 36, and finally the middle tube 38 is inserted, also between the inner tube 62 and outer tube 36.

FIG. 5 specifically shows the inner tube 62 with the coil spring in its extended position. The top most portion of the inner tube 62 is attached to the outer tube 36 by a metal pin or rivet 70 that traverses the entire width of the front leg 34. The metal pin or rivet 70 is also shown in FIGS. 1–3 to indicate the approximate height of attachment for the inner tube 62 within the outer tube 36. A one inch metal tube insert 72, taken from the same diameter of tube as the middle tube 38, is attached to the top of the inner tube 62 by weld or adhesive prior to inserting and attaching the inner tube 62 to the outer tube 36. This insert serves two purposes; first to take up the space between the inner tube 62 and the outer tube 36 at the site of attachment which makes the attachment more secure, and second to keep the spring 64 from moving into the upper curvinlinear crossbar 30 (FIGS. 1–4) when compressed. FIG. 5 also shows the action of the spring-loaded button mechanism 56, as it is pulled backwards (in shadow) by the cables 52 and 53 when either of the hand control levers 40 and 42 are pulled.

FIG. 6 shows the coil spring 64 contracted as it gets pushed on by the top of the middle tube 38. The middle tube 38 slides in a telescoping manner between the inner tube 62 and the outer tube 36 to vary the height of the front legs 34 (FIGS. 1–3) for ascending and descending stairs (FIG. 2). A longitudinal groove 66 (in shadow) must be beveled into the outer surface of the middle tube 38, stopping at least two inches from the top of the middle tube 38. The groove 66 accepts a bolt or screw 68 that is contained in the outer tube 36 which keeps the middle tube 38 from spinning about a vertical axis when extending or retracting. This is necessary to keep the apertures 39 correctly aligned in relation to the spring-loaded button 56 (FIGS. 1, 3, 4–5) to insure locking of each middle tube 38. The longitudinal groove 66 and alignment bolt 68 can be installed on any side of the front leg 34 that does not directly conflict with the apertures 39 and spring-loaded button 56.

FIG. 7 illustrates the structure of the front leg 34 with all three tubular components. The outer tube or leg sleeve portion 36 accepts the middle tube 38 which compresses the coil spring 64 (in shadow) surrounding the inner tube 62 (in shadow). A bolt 68 is shown traversing the groove 66 (in shadow) for maintaining the alignment of the middle tube 38 with the outer tube 36, a single aperture 74 is drilled into the outer tube 36 to accept the spring-loaded button 56 as it traverses through any given aperture 39 of the middle tube 38. This transfers the weight bearing load of the middle tube 38, as it pushes on the spring loaded button 56, away from the inner tube 62 and onto the stronger outer tube 36.

In operation, a person first adjusts the stair walker for use on flat surfaces by adjusting the P-shaped rear frame elements 12 at both the brackets 44 and the rear legs 16 until the rear frame elements 12 are at the correct height for that user. When confronted with an incline or going up stairs, the user would first place the front legs 34 onto the elevated surface and then pull one or both hand control mechanisms 40 and 42. This will cause the cables 52 and 53 to pull on the spring-loaded buttons 56 contained on the inner front tube portion 62 pulling the buttons 56 out of the aperture 74 on the outer tube 36 and the relevant aperture 39 on the middle leg 38. At this point the middle tube 38 is free to slide between the outer tube 36 and the inner tube 62. The user will push down on the U-shaped front frame element 28 of the walker aid device causing compression of the coil spring 64 and retraction of the middle tube 38 until the walker is again level. The hand control levers 40 and 42 are then released and the spring-loaded buttons again traverse through the apertures 39 in the middle tube 38 and the aperture 74 in the outer tube 36, effectively locking the middle tube 38 in place. The user may then proceed up the inclined surface, making any necessary adjustments in the same manner just described. When a flat surface is again reached, the hand control levers 40 and 42 can be pulled with a resulting disengagement of the middle tubes 38, letting gravity and the coil springs 64 assist in extending the middle tube 38 until the walker is again level.

When confronted with a decline or going down steps, the user must pull the hand control levers 40 and 42 while either lifting up on the front frame element 28 or hanging the front legs 34 over the edge of the stair or decline. Pulling of the hand control levers 40 and 42 will again pull on the cables 52 and 53 causing the spring-loaded buttons 56 to pull back and allow free movement of the middle tubes 38. Gravity and the coil spring 64 will cause extension of the legs until they are either stopped by the surface or step at the desired length, or the terminus of the longitudinal groove 66 is reached by the bolt 68 contained in the outer leg 36. The hand control levers 40 and 42 must then be released causing the spring-loaded button 56 to re-lock the middle tube 38. The user then completes the navigation of the obstacle and returns the walker to its neutral, horizontal position.

Thus a folding four-legged walker aid apparatus has been shown that enables the user to automatically retract the front legs simultaneously by one or both proximate hand control levers for traversing inclined surfaces or steps. The light but sturdy apparatus can be readily folded for storage or transportation purposes to minimize space requirements. A further advantage results from hand controls which remain in front because the apparatus need not be turned around as is the case with prior art devices. This walker apparatus can accommodate a wide range in height. For example, a very short person can shorten the rear legs of the present invention, lower the rear frame elements by utilizing the brackets, and still have the full adjustment range of the front legs for navigating stairs or angled surfaces.

It is to be understood that the present invention is not limited to the embodiments described above, but encompasses any and all embodiments within the scope of the following claims.

I claim:

1. A folding walker aid apparatus comprising:

a pair of tubular P-shaped frame elements, wherein each frame element comprises a horizontal top portion having a grip, a vertical front portion containing apertures designed to accept a cotter pin, and a vertical rear leg sleeve portion having a series of aligned apertures adapted to accept a spring-loaded button contained inside the top of each rear leg;

a tubular U-shaped frame element having an upper horizontal curvilinear crossbar, a lower horizontal curvilinear crossbar, and two vertical front leg portions, each consisting of an outer tube portion, and an inner tube portion;

a pair of middle tube leg portions, one designated for each of said front leg portions, adapted to slide between said outer tube portion and said inner tube portion, assisted by a coil spring, and having a series of aligned apertures;

a pair of hand controls levers located on said upper horizontal curvilinear crossbar adapted to control the extension and retraction of said middle tube leg portions;

a pair of brackets connecting said pair of tubular P-shaped frame elements to said tubular U-shaped frame element, and said pair of brackets adapted to change the height of said pair of tubular P-shaped frame elements relative to preferred and appropriate user height, and adapted to rotate said pair of tubular P-shaped frame elements inward for folding said walker apparatus; and each of said outer tube portions containing said coil spring, which in turn surrounds said inner tube portion containing a flat spring-metal supported locking button protruding at one end thereof which is adapted to be connected by a cable to each of said hand control levers;

whereby either, or both, of the said pair of hand control levers actuates both of said locking buttons simultaneously to retract from said apertures in said middle tube portion of each of said front leg portions to permit the simultaneous extension or retraction of said middle tube portions of said front leg portions for ascending or descending stairs.

2. The walker aid apparatus according to claim 1, including a spring button fastener adapted to lock each said rear leg at a predetermined height.

3. The walker aid apparatus according to claim 1, wherein each of said middle tube portions include a vertical slot, and each of said outer tube portions of said front leg portions include a bolt positioned to slide in said slot for maintaining the orientation of each of said middle tube portions to each corresponding outer tube portion of said front leg portions.

* * * * *